(12) United States Patent
Benedetto

(10) Patent No.: US 11,520,217 B1
(45) Date of Patent: Dec. 6, 2022

(54) FOUR-SIDED PROJECTION FOR AUGMENTED REALITY

(71) Applicant: Sony Interactive Entertainment Inc., Tokyo (JP)

(72) Inventor: Warren Benedetto, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/393,090

(22) Filed: Aug. 3, 2021

(51) Int. Cl.
| | |
|---|---|
| *G03B 21/14* | (2006.01) |
| *G03B 21/20* | (2006.01) |
| *H04N 9/31* | (2006.01) |
| *G03B 21/62* | (2014.01) |

(52) U.S. Cl.
CPC ....... *G03B 21/145* (2013.01); *G03B 21/2046* (2013.01); *G03B 21/62* (2013.01); *H04N 9/31* (2013.01)

(58) Field of Classification Search
CPC ...... G03B 21/56; G03B 21/62; G03B 21/145; G03B 21/2046; G03B 21/2053; H04N 9/31; H04N 9/312; H04N 9/3141; H04N 9/3147

See application file for complete search history.

(56) References Cited

U.S. PATENT DOCUMENTS

| | | | | |
|---|---|---|---|---|
| 2010/0157258 | A1* | 6/2010 | Wang | G03B 21/28 353/98 |
| 2012/0188637 | A1* | 7/2012 | Joseph | G02B 30/52 359/478 |
| 2014/0092085 | A1* | 4/2014 | Chen | H04N 13/39 345/419 |
| 2017/0243433 | A1* | 8/2017 | Luciano, Jr. | G07F 17/3239 |
| 2018/0348623 | A1* | 12/2018 | Richman | G03B 21/602 |
| 2019/0138266 | A1* | 5/2019 | Takechi | H04L 51/58 |
| 2019/0235375 | A1* | 8/2019 | Martinez | G03B 21/10 |
| 2019/0282894 | A1* | 9/2019 | Zarganis | A63F 13/213 |

* cited by examiner

*Primary Examiner* — Sultan Chowdhury
(74) *Attorney, Agent, or Firm* — John L. Rogitz

(57) ABSTRACT

A computer simulation may include a tabletop game in which multiple players each wearing a head-mounted display (HMD) view a tabletop projector housing with a different aspect of the game for each side of the housing. A projector assembly may be inside the housing. The housing may be a screen that unfolds into cube, and the projector projects light in all four screens so that everyone gets different perspective. A player may be enabled to switch between perspectives for different player's angles.

20 Claims, 7 Drawing Sheets

FOUR-SIDED PROJECTION FOR AUGMENTED REALITY

FIELD

The present application relates generally to four-sided projection for augmented reality.

BACKGROUND

As understood herein, multiple computer gamers may play the same computer game in a room wearing headsets that overlay virtual objects onto real world objects seen through the headsets (augmented reality). Present principles are directed to enhancing such game play.

SUMMARY

Accordingly, an apparatus includes a housing with plural transparent or translucent side walls oriented vertically. A projector assembly is in the housing for projecting images onto the side walls such that the images can be seen on the side walls by a viewer located outside the housing. Also, at least one processor controls the projector assembly to present demanded images on each of the plural side walls.

The housing may include four side walls and the side walls can be transparent or translucent, or some side walls can be transparent and another one or more side walls may be translucent.

In one example, the projector assembly includes at least one projector rotatably mounted in the housing. In another example, the projector assembly includes plural stationary projectors oriented toward respective side walls. In another example, the projector assembly includes an optical system such as micro-mirrors and/or prisms to redirect light received from a projector onto four successive walls. If desired, the projector assembly can project demanded images in reverse on the side walls.

In another aspect, a method includes projecting onto an inside surface of a first wall of a projector housing at least one demanded image from a computer simulation rendered from a first perspective view, and projecting onto an inside surface of a second wall of the projector housing at least one demanded image from the computer simulation rendered from a second perspective view.

In another aspect, a system includes a system includes at least one computer medium that is not a transitory signal and that in turn instructions executable by at least one processor to receive at least one demanded image from at least one computer simulation. The instructions are executable to, from the demanded image, generate at least first and second demanded images each configured as if viewed from a respective first and second perspective. The instructions are further executable to project onto respective first and second walls of a housing the first and second demanded images.

The details of the present application, both as to its structure and operation, can be best understood in reference to the accompanying drawings, in which like reference numerals refer to like parts, and in which:

BRIEF DESCRIPTION OF THE DRAWINGS

FIG. 3A illustrates a data structure;

DETAILED DESCRIPTION

Figure 1:
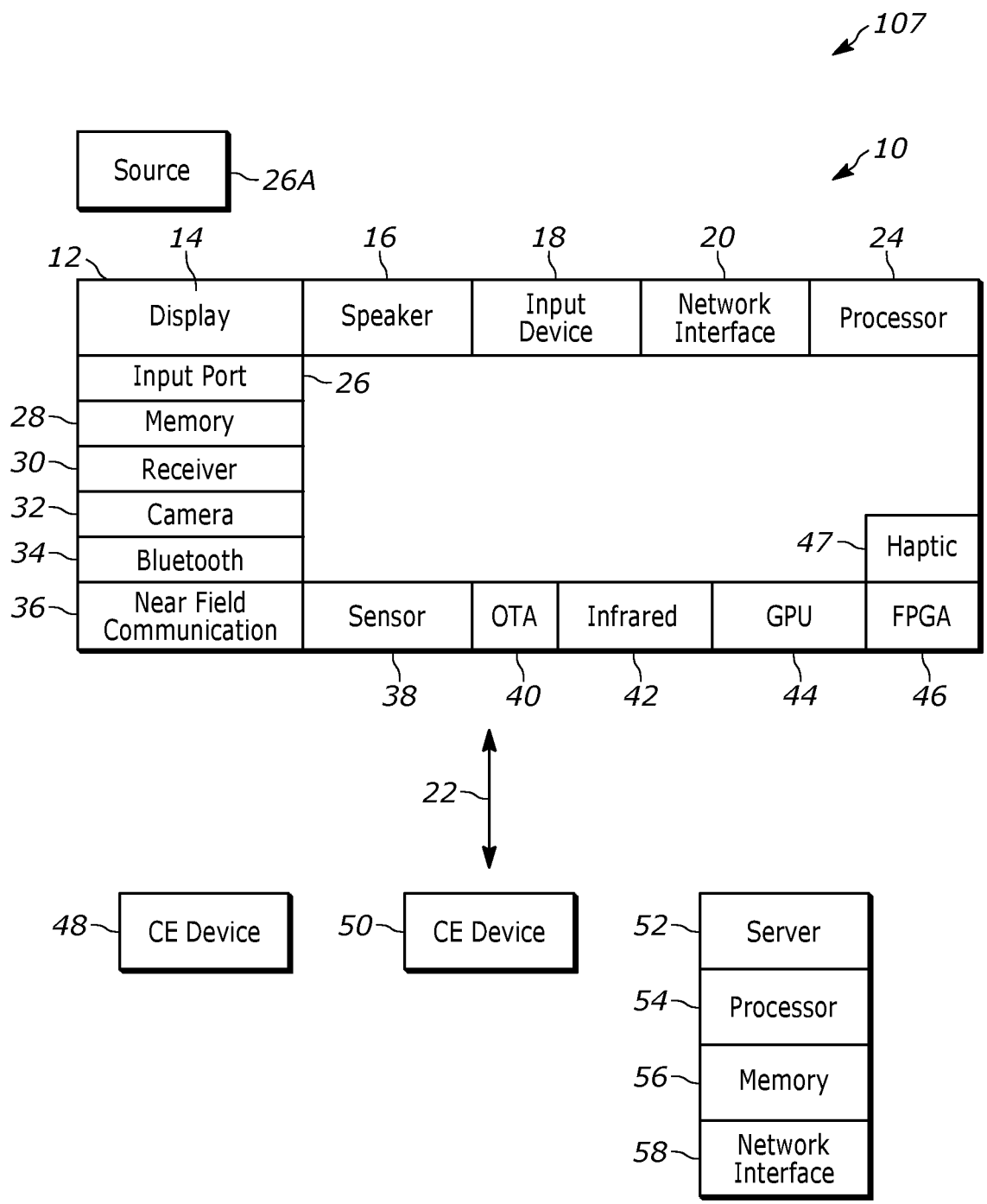
FIG. 1 is a block diagram of an example system including an example in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command), providing input to the processor 24. The AVD 12 may include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics generators 47 may be provided for generating tactile signals that can be sensed by a person holding or in contact with the device.

Still referring to FIG. 1, in addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other devices of FIG. 1 over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown in FIG. 1 or nearby.

The components shown in the following figures may include some or all components shown in FIG. 1. The user interfaces (UI) described herein may be consolidated, expanded, and UI elements may be mixed and matched between UIs.

Figure 2:
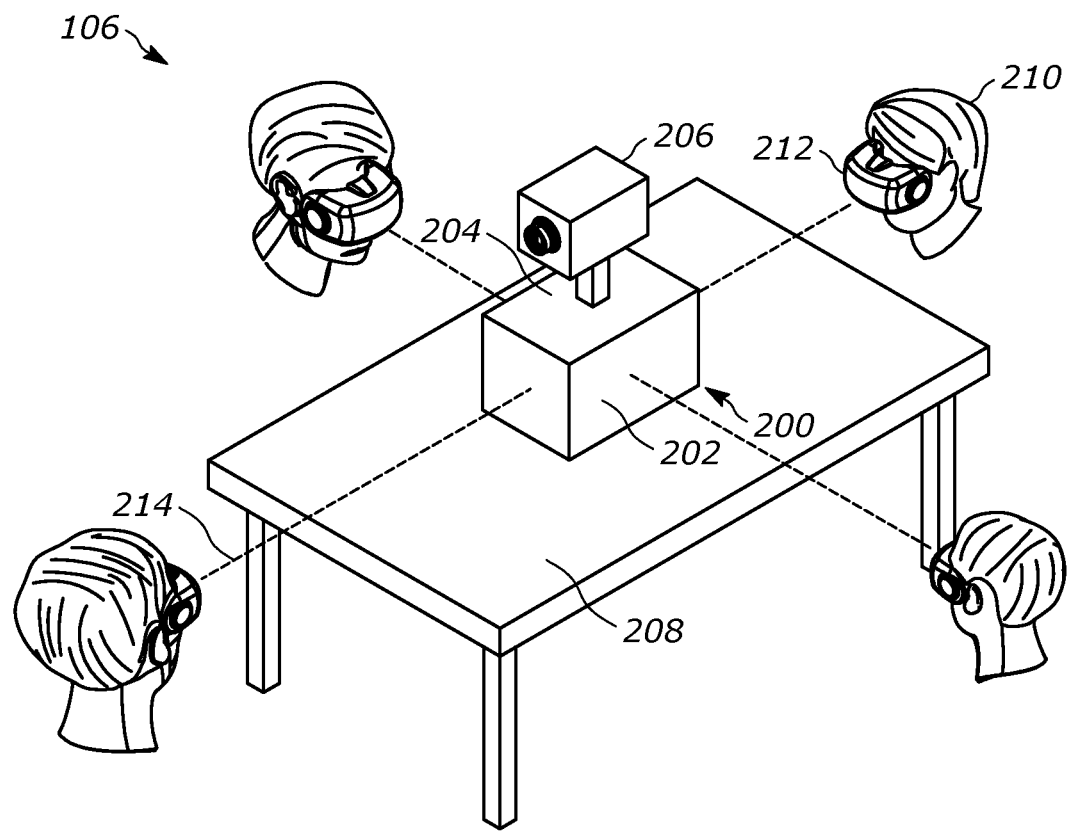
FIG. 2 schematically illustrates a four-sided projector assembly on a table.

FIG. 2 illustrates a projector housing 200 with four side walls 202 each of which may be perpendicular to adjacent side walls and to a top 204 and bottom as shown to form a parallelepiped-shaped housing, it being understood that other housing shapes (e.g., pyramidal) with fewer or greater than four side walls may be used. The side walls may be rigid or may be flexible screen-like structures that can be folded. The side walls 202 may be transparent or translucent, such that light projected from within the housing can propagate through the side walls 202 and can be seen by a viewer looking at the outer surfaces of the side walls 202. A camera 206 may be provided on or near the housing 200 as shown for purposes to be shortly disclosed.

With this structure, the projector housing 200 may be disposed on a tabletop 208 as shown so that users 210, who may each wear a respective augmented reality (AR) headset 212, can view a respective side wall 202 as indicated by the dashed lines 214.

It is to be understood that while the users 210 may view the projector housing 200 through headsets, they may also view it with no headsets. The projector housing 200 is in the middle of the users to project the light onto the four sides of the cube, which are viewable without hardware, just like a movie screen.

A projector assembly is inside the housing 200 to project images onto some and preferably all of the side walls 202 and, if desired, onto the top surface 204 as well. The images may be, e.g., demanded video images from a computer simulation such as a computer game, and each side wall may present a view of the computer simulation from a perspective that is different from side wall 202 to side wall 202. For example, the demanded images presented on a first side wall 202 may be images of the game environment inside the housing 200 as would be seen from the perspective of a first user who is looking at that side wall as indicated by computer vision analysis of images from the camera 206, while the demanded images presented on a second side wall 202 may be of the game environment as would be seen from the (different) perspective of a second user who is looking at that side wall.

Figure 3:
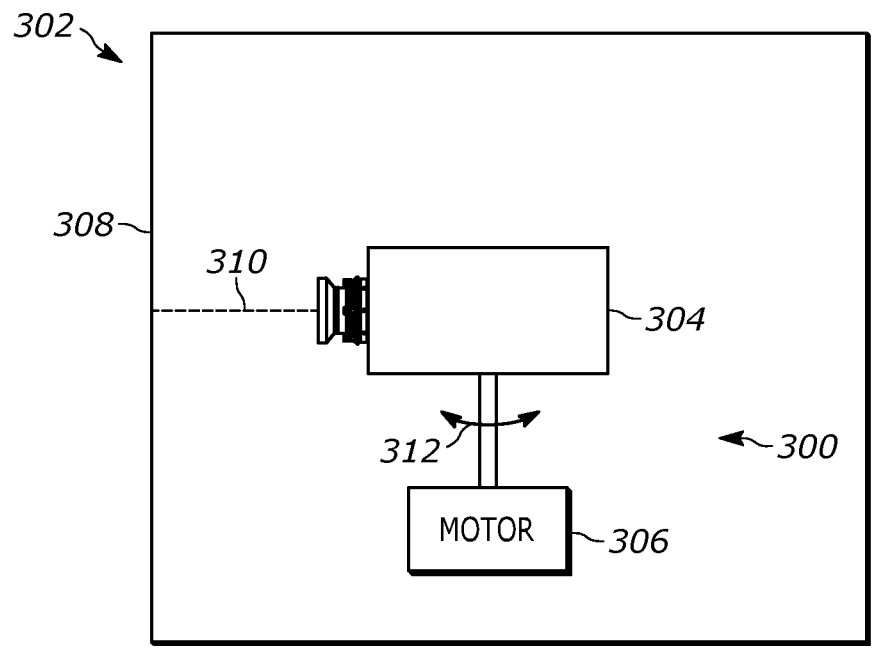
FIG. 3 schematically illustrates a first embodiment of the projector assembly.
Figure 4:
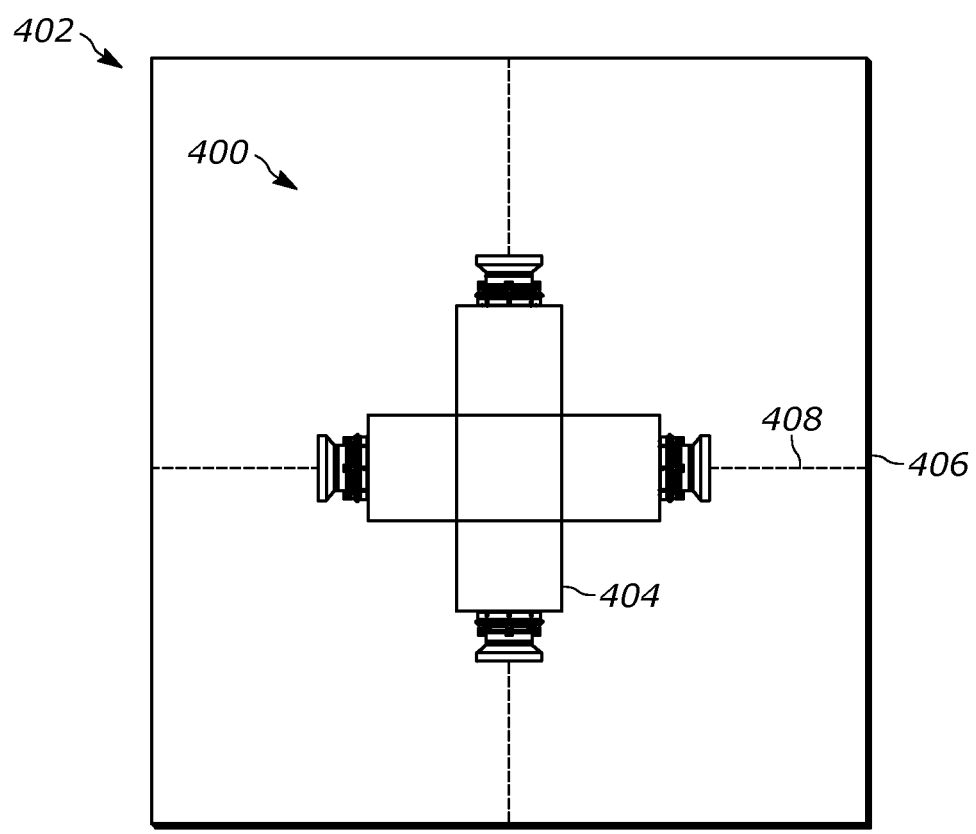
FIG. 4 schematically illustrates a second embodiment of the projector assembly.

FIGS. 3 and 4 illustrate embodiments of the projector assembly. In FIG. 3, a projector assembly 300 inside a projector housing 302 that is in all essential respects identical in configuration and operation to the housing 200 shown in FIG. 2 includes a single projector 304 that is rotatably mounted in the housing 300, such that the projector can be rotated by a motor 306 to sequentially project images onto each of the side walls 308 of the housing 302 as indicated by the dashed line 310, with projector rotation indicated by the arrows 312. In such an embodiment, the projector 304 may project a single pixel from a first demanded image onto a first side wall, then rotate 90 degrees to project a single pixel from a second demanded image onto the adjacent side wall, and so on. Or, the projector 304 may project a single line of pixels from a first demanded image onto one side wall, then rotate 90 degrees to project a single line of pixels from a second demanded image onto the adjacent side wall, and so on. Yet again, the projector 304 may project a single frame of pixels from a first demanded image onto one side wall, then rotate 90 degrees to project a single frame of pixels from a second demanded image onto the adjacent side wall, and so on. Still further, the projector 304 may project two or more frames of pixels from a first demanded image onto one side wall, then rotate 90 degrees to project a two or more frames of pixels from a second demanded image onto the adjacent side wall, and so on.

It is to be understood that the rotatable projector assembly 300 shown in FIG. 3 may include two opposed projectors each of which projects images onto two respective side walls.

On the other hand, FIG. 4 illustrates a stationary projector assembly 400 inside a projector housing 402 that is in all essential respects identical in configuration and operation to the housing 200 shown in FIG. 2, with the projector assembly 400 including four projectors 404 each of which is aimed at a respective side wall 406 such that each projector 404 projects demanded images from respective perspectives onto its own side wall and no others, as indicated by the lines 408.

Figure 5:
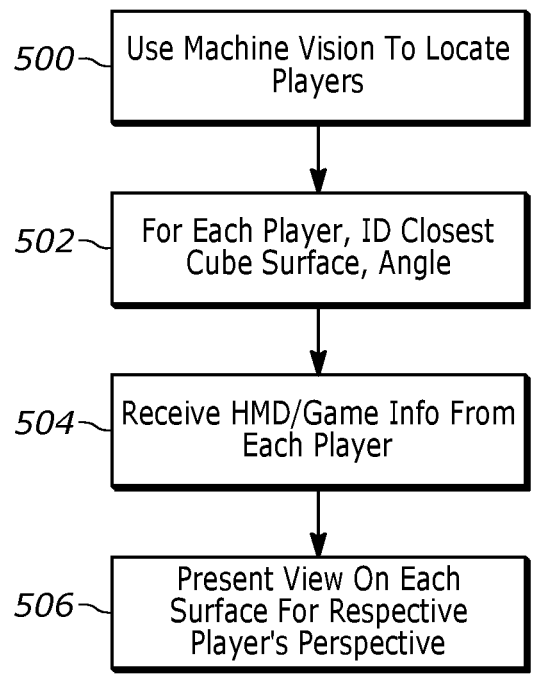
FIG. 5 illustrates example logic in example flow chart format.

FIG. 5 illustrates example logic that may be executed by a processor within any of the projector housings described herein. Commencing at block 500, the processor executes machine vision on images from the camera 206 shown in FIG. 2 to locate the various users/players 210. Proceeding to block 502, for each user/player the nearest cube surface to that player is identified along with the perspective (angle) from which that player views the closest surface.

Moving to block 504, additional information including HMD 212 pose information and computer simulation geometric environment information is received and/or calculated from a base simulation geometry for the particular perspective of each player relative to the side wall being looked at by the player (typically the closest side wall). Demanded images of the computer simulation geometric environment are then projected onto each respective inside surface of each respective side wall at block 506 according to the perspective of the viewing player. Note that a game object (e.g., a centipede) may can move from screen to another, in this example, in the manner of a centipede wrapping around one surface to another.

Note that the logic of FIG. 5 may be executed by a headset's graphics processing unit (GPU) or the headset's central processing unit (CPU) or the processor within the projector housing, or a combination thereof. However, the logic of FIG. 5 may also be executed by a dedicated processor separate from the GPU and CPU to mostly or only perform the logic reflected in FIG. 5 to reduce latency in virtual image rendering while leaving other processing tasks to the CPU/GPU. The dedicated processor may be, for example, an application-specific integrated circuit (ASIC) or a field-programmable gate array (FPGA). The logic of FIG. 5 may also be executed at scan out by a digital analog converter (DAC).

Yet again, the logic of FIG. 5 may be cloud-driven with images presented on the projector screens being sent via, e.g., 5G from a game server to a processor in the projector housing or headset that essentially is a thin input reprojector.

In still other embodiments the projector housings herein may not include any projector but may instead fit over a portable device such as a smart phone with projector capabilities.

Pixel lines may be read out of frame buffers in reverse order to present images in reverse on the inside surfaces of the side walls so that when viewed looking at the outside surfaces, the images appear non-reversed (mirror images). In other words, in projecting the demanded images onto the inside surfaces of the side walls to be seen from looking at the outside surfaces, the images may be projected in reverse (mirror image) of the demanded images from the simulation onto the inside surfaces. To do this, for example, each line of pixels may be read out from a buffer in a reverse sequence compared to the sequence the pixel values would be read out normally.

Figure 6:
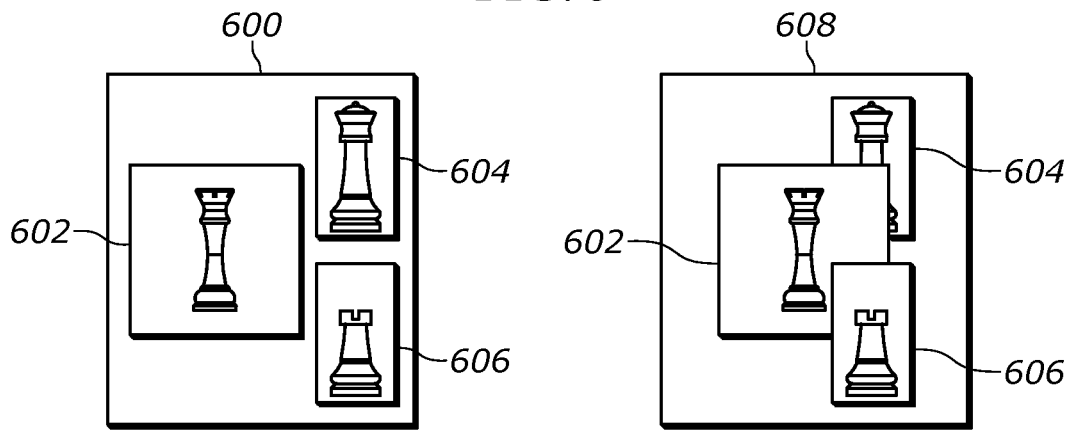
FIG. 6 illustrates the four sides of the projector housing each showing a different game perspective.
Figure 6:
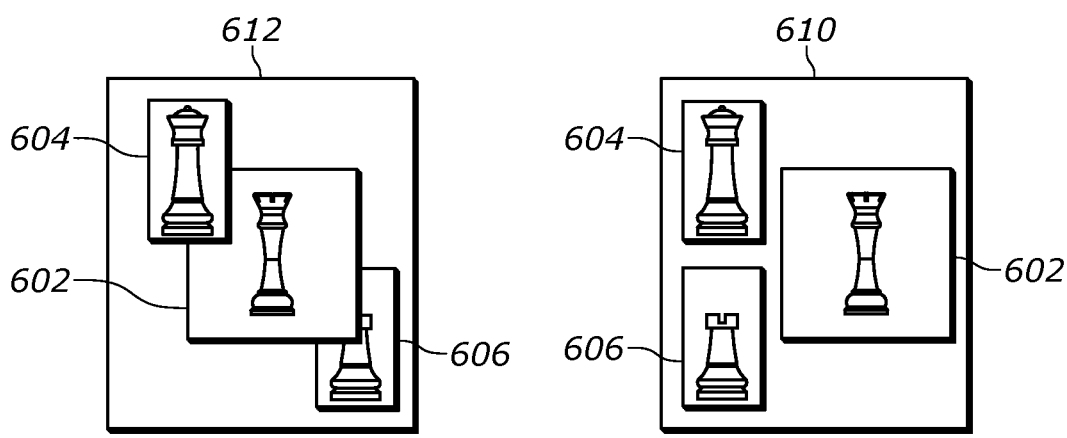

FIG. 6 illustrates showing four side of a cubic projector housing, each presenting a different perspective of a computer simulation, in the example shown, a chess game. A first side wall 600 may present images of a king 602 and on the king's left (to the right of the king from the viewer's perspective) a queen 604 below which is a rook 606.

In contrast, a second side wall 608 that is orthogonal to the first side wall 600 can present the king 602 partially occluding the image of the queen 604 and being partially occluded by the rook 606. A third side wall 610 which is orthogonal to the second side wall 608 and thus opposite and parallel to the first side wall 600 presents the queen 604 and rook 606 to the right of the king 602 (to the left of the king from the viewer's perspective). A fourth side wall 612 which is orthogonal to the first and third side walls 600, 610 and thus opposite to and parallel with the second side wall 608 presents the king 602 being partially occluded by the image of the queen 604 and partially occluding the rook 606.

Figure 7:
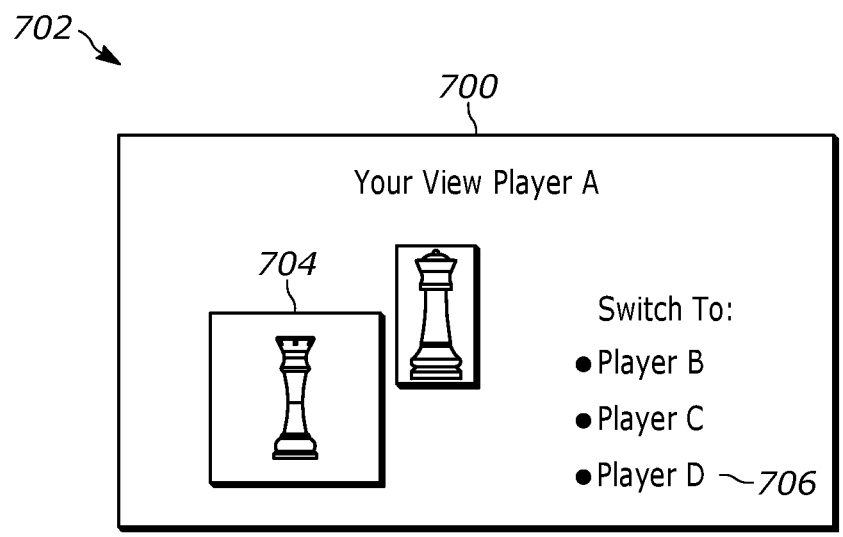
FIG. 7 illustrates an example user interface (UI) consistent with present principles.

FIG. 7 illustrates a display 700 such as any display herein including a HMD that presents a user interface (UI) 702 allowing a user to switch views of the computer simulation to that of another player (side wall). The UI 702 includes the current view 704 of the simulation for the user ("player A"). The UI 702 can further include selectors 706 to switch the view 704 to that of the respective player indicated by the respective selector 706.

Figure 8:
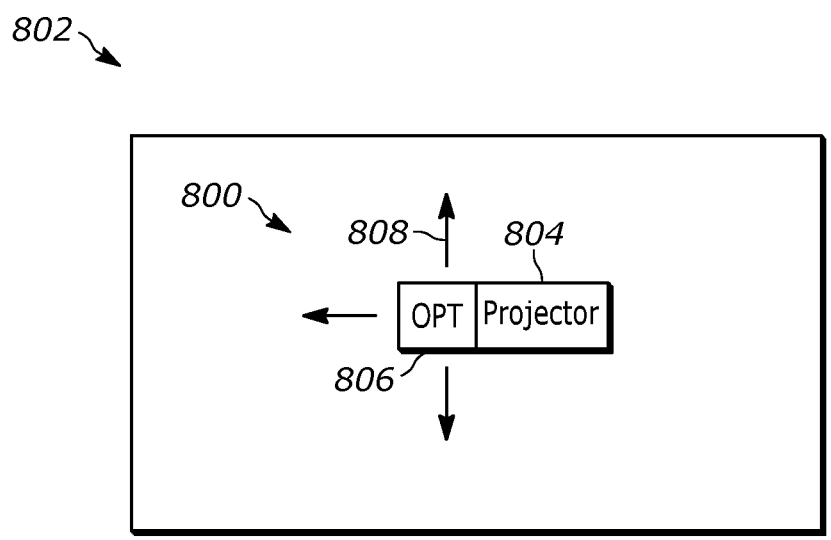
FIG. 8 schematically illustrates a third embodiment of the projector assembly.

Turning to FIG. 8, yet a third embodiment of a projector assembly 800 is shown, inside a projector housing 802 that is in all essential respects identical in configuration and operation to the housing 200 shown in FIG. 2 and which includes a single projector 804 stationarily mounted in the housing and oriented to direct light into an optical system 806. The projector 804 may be a pico projector and the optical system 806 may include mirrors such as micromirrors and/or one or more prisms to divide light from the projector into plural directions, indicated by the arrows 808, one direction for each wall of the housing it is desired to project images on to. In this embodiment as well as in others in which it is appropriate, a single image for a single surface can be mapped to four different surfaces and predeformed to account for parallax from the projector. The source video thus can be segmented into four spaces.

Figure 9:
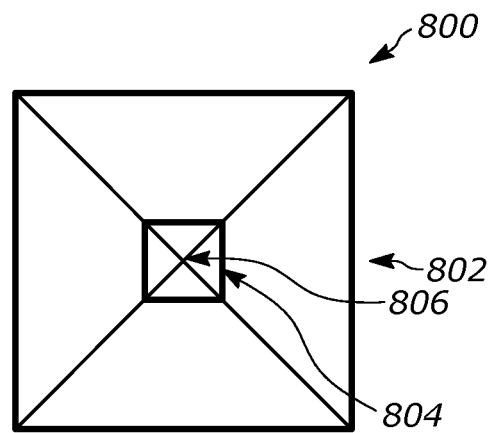
FIGS. 9 and 10 schematically illustrate top-down views of an example embodiment consistent with FIG. 8.

FIGS. 9-12 illustrate the above principles further. In FIG. 9, the optical system 806 (mirrors and/or prisms) are vertically coaxial with the projector 804. Each side of the example cubic projector housing 802 is a projector screen. The projector 804 may project light vertically upwardly into the optical systems 806, which redirects light horizontally outward toward each of the four projector screens.

Figure 10:
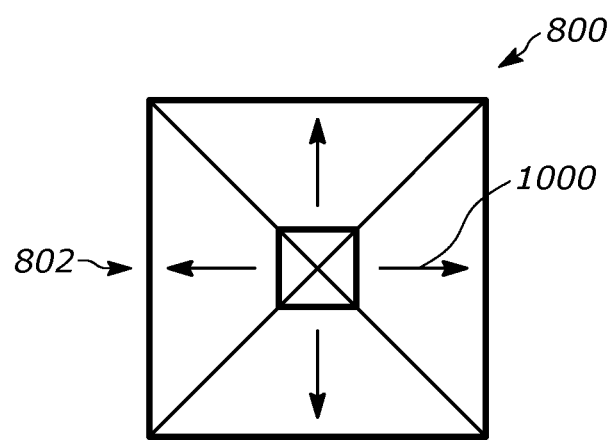
Figure 11:
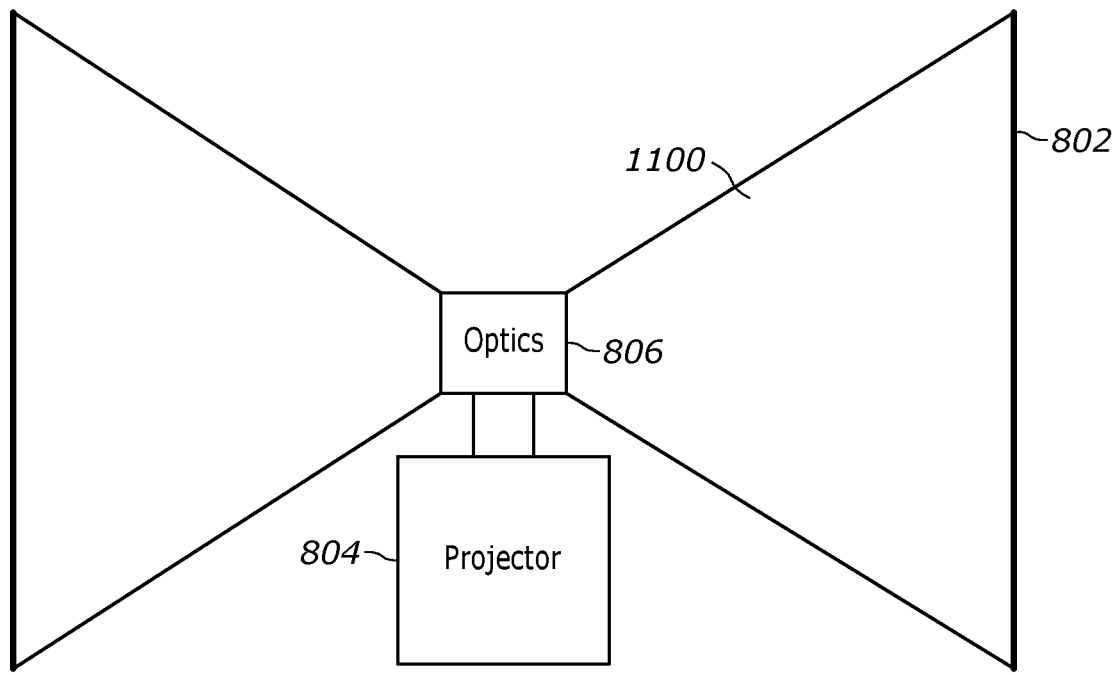
FIG. 11 schematically illustrates a side view of the embodiment of FIGS. 9 and 10.

FIG. 10 illustrates that when the light from the projector of FIG. 9 impinges upon the optical system it is split in four ways as indicated by the lines 1000 with each split being directed toward a respective one of the sides of the projector housing. FIG. 11 illustrates that the projector in the center of the housing projects light upward into the optical system 806, which intercepts the projected light and redirects it as indicated by the cones 1100 towards the sides of the projector housing.

Figure 12:
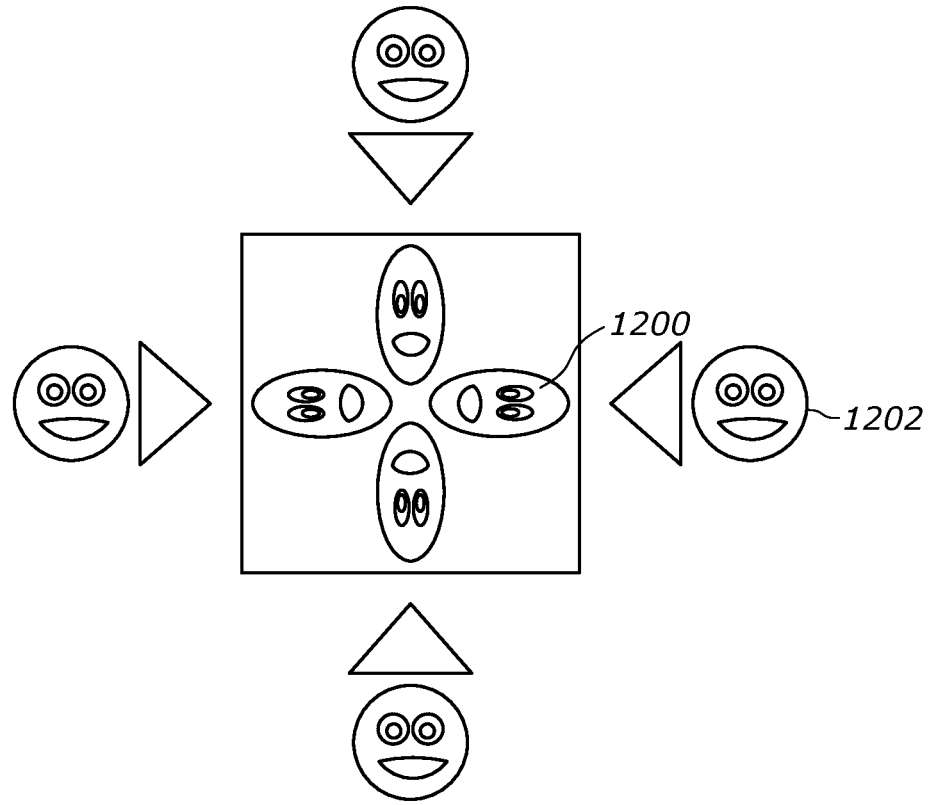
FIG. 12 schematically illustrates source image distortion.

FIG. 12 illustrates that the source images, indicated by the ovular objects 1200, prior to impinging against the sides of the projector housing are distorted, so that after projection the images 1202 (now depicted as being circular and thus not distorted) appear "normal", i.e., not distorted. The light from the projector is transformed by the optical system 806 to appear undistorted on the projector screens (the four sides of the housing).

While the particular embodiments are herein shown and described in detail, it is to be understood that the subject matter which is encompassed by the present invention is limited only by the claims.

What is claimed is:

1. An apparatus comprising:
    a housing comprising plural transparent or translucent side walls;
    a projector assembly in the housing for projecting images onto the side walls such that the images can be seen on the side walls by a viewer located outside the housing; and
    at least one processor controlling the projector assembly to present demanded images rendered as being from respective different perspectives on each of the plural side walls.

2. The apparatus of claim 1, wherein the housing comprises four side walls.

3. The apparatus of claim 1, wherein the side walls are translucent.

4. The apparatus of claim 1, wherein the projector assembly comprises at least one projector rotatably mounted in the housing.

5. The apparatus of claim 1, wherein the projector assembly comprises plural stationary projectors oriented toward respective side walls.

6. The apparatus of claim 1, wherein the projector assembly comprises at least one stationary projector oriented to project light into an optical system that divides the light onto the plural walls according to the demanded images.

7. The apparatus of claim 1, wherein the projector assembly projects demanded images in reverse on the side walls.

8. A method, comprising:
    projecting onto an inside surface of a first wall of a projector housing at least one demanded image from a computer simulation rendered from a first perspective view; and projecting onto an inside surface of a second wall of the projector housing at least one demanded image from the computer simulation rendered from a second perspective view.

9. The method of claim 8, comprising:

projecting onto an inside surface of a third wall of the projector housing at least one demanded image from the computer simulation rendered from a third perspective view; and projecting onto an inside surface of a fourth wall of the projector housing at least one demanded image from the computer simulation rendered from a fourth perspective view.

10. The method of claim 8, wherein the walls are transparent.

11. The method of claim 8, wherein the walls are translucent.

12. The method of claim 8, wherein the projecting is executed using a projector assembly inside the projector housing.

13. The method of claim 12, wherein the projector assembly comprises at least one projector rotatably mounted in the housing.

14. The method of claim 12, wherein the projector assembly comprises plural stationary projectors oriented toward respective side walls.

15. The method of claim 8, comprising projecting demanded images in reverse on the walls.

16. A system comprising:

at least one computer storage that is not a transitory signal and that comprises instructions executable by at least one processor to:

receive at least one demanded image from at least one computer simulation;

from the demanded image, generate at least first and second demanded images each configured as if viewed from a respective first and second perspective; and project onto respective first and second walls of a housing the first and second demanded images.

17. The system of claim 16, comprising the at least one processor.

18. The system of claim 16, wherein the instructions are executable to:

project each first and second demanded image in reverse onto the respective first and second walls.

19. The system of claim 16, wherein the instructions are executable to:

present on at least one display at least one user interface (UI) comprising:

at least a first selector selectable to switch viewing from the first demanded image to the second demanded image.

20. The system of claim 16, wherein the instructions are executable to:

project each first and second demanded image onto the respective first and second walls using a rotating projector.

* * * * *